US009666002B2

(12) United States Patent
Harucksteiner et al.

(10) Patent No.: US 9,666,002 B2
(45) Date of Patent: May 30, 2017

(54) METHOD FOR OPERATING A VEHICLE BARRIER

(71) Applicant: SKIDATA AG, Groedig/Salzburg (AT)

(72) Inventors: Guido Harucksteiner, Eugendorf (AT); Thomas Schlechter, Seekirchen am Wallersee (AT); Reinhard Surkau, Traunstein (DE)

(73) Assignee: SKIDATA AG, Groedig/Salzburg (AT)

( * ) Notice: Subject to any disclaimer, the term of this patent is extended or adjusted under 35 U.S.C. 154(b) by 333 days.

(21) Appl. No.: 14/639,243

(22) Filed: Mar. 5, 2015

(65) Prior Publication Data

US 2015/0254914 A1 Sep. 10, 2015

(30) Foreign Application Priority Data

Mar. 6, 2014 (EP) .................................. 14158170

(51) Int. Cl.
*B60R 25/00* (2013.01)
*G07C 9/00* (2006.01)
(Continued)

(52) U.S. Cl.
CPC .......... *G07C 9/00126* (2013.01); *E01F 13/06* (2013.01); *E05F 1/002* (2013.01); *E05F 15/00* (2013.01); *E05F 15/76* (2015.01); *E06B 11/027* (2013.01); *G06Q 20/30* (2013.01); *G06Q 30/0284* (2013.01); *G06T 7/20* (2013.01); *G07B 15/00* (2013.01); *G08B 13/08* (2013.01); *H04N 5/33* (2013.01); *H04N 7/183* (2013.01); *E05F 2015/767* (2015.01); *E05Y 2400/10* (2013.01);
(Continued)

(58) Field of Classification Search
CPC . E01F 13/06; E05F 15/00; E05F 15/76; E05F 1/002; E05F 2015/767; E05Y 2400/10; E05Y 2900/402; E06B 11/027; G06K 2209/15; G06K 2209/23; G06Q 20/30; G06Q 30/0284; G06T 2207/30261; G06T 7/20; G07B 15/00; G07B 15/04; G07C 9/00126; G08B 13/08; H04N 5/33; H04N 7/183
USPC ................. 340/5.53, 5.64, 5.7; 382/105, 115
See application file for complete search history.

(56) References Cited

U.S. PATENT DOCUMENTS 6,630,893 B2 * 10/2003 Schuette ................ G08G 1/146
340/5.2
6,747,687 B1 * 6/2004 Alves ..................... H04N 7/188
340/932.2
(Continued)

FOREIGN PATENT DOCUMENTS

DE           19506193 A1    2/1995
DE       202009017623 U1    5/2010
(Continued)

*Primary Examiner* — Ojiako Nwugo
(74) *Attorney, Agent, or Firm* — Karl F. Milde, Jr.; Eckert Seamans Cherin & Mellott, LLC

(57) ABSTRACT

In a method for operating a vehicle barrier (1) having a barrier column (2), a barrier arm (4) and a drive mechanism for pivoting the barrier arm (4) between a blocking position and an open position, a camera (7) is used for vehicle recognition, for the license plate recognition, for recognizing a following vehicle and for monitoring for vandalism, and the images thereof are evaluated by an electronic evaluation logic that is coupled to control of the vehicle barrier (1).

13 Claims, 2 Drawing Sheets

(51) Int. Cl.
*E01F 13/06* (2006.01)
*E05F 15/76* (2015.01)
*E05F 1/00* (2006.01)
*E05F 15/00* (2015.01)
*E06B 11/02* (2006.01)
*G06Q 20/30* (2012.01)
*G06Q 30/02* (2012.01)
*G06T 7/20* (2017.01)
*G07B 15/00* (2011.01)
*G08B 13/08* (2006.01)
*H04N 5/33* (2006.01)
*H04N 7/18* (2006.01)
*G07B 15/04* (2006.01)
*E05F 15/73* (2015.01)

(52) U.S. Cl.
CPC .... *E05Y 2900/402* (2013.01); *G06K 2209/15* (2013.01); *G06K 2209/23* (2013.01); *G06T 2207/30261* (2013.01); *G07B 15/04* (2013.01)

(56) References Cited

U.S. PATENT DOCUMENTS

| | | | |
|---|---|---|---|
| 8,340,902 B1 * | 12/2012 | Chiang | G05D 1/0044 340/425.5 |
| 2004/0165750 A1 * | 8/2004 | Chew | G06K 9/00885 382/105 |
| 2005/0168321 A1 * | 8/2005 | Fitzgibbon | G07C 9/00158 340/5.53 |

FOREIGN PATENT DOCUMENTS

| | | |
|---|---|---|
| EP | 2597198 A1 | 11/2011 |
| JP | 2000011297 A | 1/2000 |
| KR | 200453006 Y1 | 4/2001 |

* cited by examiner

METHOD FOR OPERATING A VEHICLE BARRIER

BACKGROUND OF THE INVENTION

The present invention relates to a method for operating a vehicle barrier. In particular, the invention relates to a method for operating a vehicle barrier with a barrier column, a barrier arm and a drive mechanism for pivoting the barrier arm between a blocking and an open position.

According to the prior art, vehicle barriers designed in this manner are, in particular, used as parking barrier gates for controlling entry and exit driveways of parking areas and as vehicle barriers for operating toll gates.

One significant parameter for the operation of such a vehicle barrier is vehicle recognition. The objective is to recognize if a vehicle is standing in front of an entry or exit driveway blocked by a vehicle barrier, and in the event that a vehicle stands in front of the entry or exit driveway, to determine how many axles it has and if it is a motorcycle.

It is known from the prior art to use induction loops installed in the driveway before the entry or exit in connection with downstream evaluation electronics for the vehicle recognition. The induction loops are used to recognize a vehicle at the ticket input and output and also to avoid pivoting of the barrier am of a vehicle barrier into the blocking position if a vehicle could be damaged by doing so, i.e., to avoid that the vehicle barrier closes too soon.

However, the use of induction loops for vehicle recognition results in a complex and cost-intensive installation in the respective roadway, in maintenance fraught with difficulties and in a limited service life since the roadway can sink or be damaged by the weight of the vehicles, which in turn can damage the loops. The loops can also corrode due to water ingress after damage to the road when the insulation is defective or insufficient. An additional disadvantage is the fact that the connection to the evaluation electronics requires wiring, which leads to additional higher installation and maintenance expenditures.

Another parameter for operating a vehicle barrier after vehicle recognition is the detection of the vehicle's license plate. According to the prior art, this is done via a photo or video camera and subsequent evaluation of the obtained images using character recognition.

When operating a vehicle barrier, recognizing a following vehicle is also essential, because when a vehicle follows the vehicle driving in the front, the entering vehicle is not recognized and logged in and, in the case of an exiting vehicle, financial losses may be the result.

It is furthermore important for the operation of such vehicle barriers to recognize vandalism attempts in time to initiate appropriate counter-measures. In the context of the present patent application, vandalism refers to unauthorized entry or exit as well as to unauthorized movement of the barrier arm, which could damage the barrier arm and/or the vehicle barrier, among other things.

SUMMARY OF THE INVENTION

The problem addressed by the current invention is that of providing a method for operating a vehicle barrier with a barrier column, a barrier arm and a drive mechanism for pivoting the barrier arm between a blocking position and an open position that reduces the components required for the operation through its execution.

Accordingly, a method for operating a vehicle barrier with a barrier column, a barrier arm and a drive mechanism for pivoting the barrier arm between a blocking position and an open position, comprises obtaining digital images using a camera and evaluating these images using an electronic evaluation logic, coupled to a control for the vehicle barrier, for vehicle recognition, license plate recognition, recognition of a following vehicle and the occurrence of vandalism.

The camera, preferably a conventional digital camera, is preferably integrated into the barrier column but can also be arranged at another suitable location, even independent of the vehicle barrier. The arrangement of the camera is such that the functions of vehicle recognition, license plate recognition, recognition of a following vehicle and monitoring for vandalism can be carried out.

The camera can be designed as a conventional digital camera but also as a camera for close-range photogrammetry. In the context of one embodiment of the invention, the camera can be designed as a camera that is synchronizable with an infrared source with a sensor that can detect visible and infrared light, wherein optionally images can be generated in the visible and/or infrared range. Images can be generated in the visible range and a 3D reconstruction of a detected object based on a runtime measurement in synchronization with the infrared source, or a 3D reconstruction of a detected object based on a runtime measurement in synchronization with the infrared source, can be created. This camera has five modes: "images in the visible range", "images in the infrared range", "images in the visible and infrared range", "images in the visible range and 3D reconstruction" and "3D reconstruction." In view of these different modes, the camera will hereinafter be called a "multi-camera."

The functions of license plate recognition, recognizing following vehicles and monitoring for vandalism can be carried out by the multi-camera through the images generated in the visible range and/or through the images generated in the infrared range, wherein by the parallel evaluation of the images of both ranges the robustness of the results is increased. For example, in the case where license plates are covered with snow or ice, license plate recognition may bring better results in the infrared range. In an advantageous manner, the infrared range can be used for monitoring for vandalism at low light conditions. Here, for license plate recognition, recognition of a following vehicle and monitoring for vandalism, it is possible to switch automatically from the mode "images in the visible light" to the mode "images in the infrared range" or "images in the visible and the infrared range" when the ambient brightness drops below a threshold value. 3D reconstruction is preferably performed for vehicle recognition, wherein a parallel evaluation of the images in the visible range is carried out as an option.

Furthermore, through the enabled 3D reconstruction of the acquired objects, accurate vehicle recognition and classification of the detected object can be carried out. For example, it can be recognized if the detected object is or is not a motor vehicle, and in the event that a motor vehicle is detected, the type of motor vehicle involved can be determined, such that individual tariffs become possible for different vehicle categories. It is also possible to keep a vehicle barrier closed if the detected object is not a motor vehicle.

In addition, an unauthorized exit is avoided by the 3D reconstruction of detected objects if the vehicle detected at the exit does not fit to the data, which are associated with the entry ticket based on the corresponding detection at entry.

The 3D reconstruction can be combined with the image in the visible range in order to obtain additional information, for example about the color of the detected vehicle or the ambient brightness, or to carry out monitoring for vandalism, license plate recognition or recognition of a following vehicle parallel to the 3D reconstruction.

With 3D reconstruction of a detected object based on runtime measurement with synchronization with the infrared source, the illumination of the detected object to be analyzed using the infrared source is limited to a specified time window. Since it is infrared light, advantageously people in the vicinity will not be affected. The sensor of the camera that is synchronized with the infrared source or the evaluation electronics assigned to the camera is aware of the moment of transmission of the infrared light and the moment of detection of each individual pixel of the recorded image, i.e., the runtime of the infrared light associated with the pixel. Since the detected infrared light can originate exclusively from reflections of the object to be observed, the distance of every part of the measured object to the multi-camera can, therefore, be calculated. Through this concept it possible to reconstructed a 3D image using a 2D sensor and the runtime of the infrared light, which then can be compared with a database to identify the object automatically.

According to one embodiment of the invention, the multi-camera can be designed as a digital camera with a 2D image sensor designed as a CCD or CMOS sensor that can be used to measure distances based on a runtime measurement in synchronization with a pulsed infrared source and, based on the measured distances, a 3D reconstruction of a detected object can be carried out. Here, the camera does not have an infrared cut-off filter nor does it have an infrared cut-off filter that can be dynamically activated in full or in part or deactivated in relation to the pixels of the image sensor. Individual areas of the image sensor for which the infrared cut-off filter is deactivated are used for the 3D reconstruction or for images in the infrared range, wherein the remaining areas of the sensor are used for images of high color quality in the visible light spectrum. In the event that no infrared cut-off filter is present, individual areas of the image sensor are used for the 3D reconstruction or for images in the infrared range, whereby the remaining areas of the sensor are used for images in the visible light spectrum.

The respective pixel areas of the sensor can be contiguous such that individual areas each comprising a plurality of pixels are used for the 3D reconstruction and/or for images in the infrared range and individual areas each comprising a plurality of pixels for images in the visible light spectrum. As an alternative the sensor area can be assigned alternating pixel by pixel to the 3D reconstruction and/or images in the infrared range and images in the visible light spectrum.

The infrared cut-off filter can be activated or deactivated as a function of the time for the entire sensor area in time multiplex operation, wherein the use of the image sensor can be divided in time for images in the infrared range, including 3D reconstruction, and for images in the visible light spectrum.

Furthermore, according to one embodiment, the multi-camera can have a 2D image sensor designed as a CMOS sensor, wherein the multi-camera can be used to measure distances based on a runtime measurement in synchronization with a pulsed infrared source and a 3D reconstruction of a detected object can be carried out based on the measured distances, wherein the image sensor is expended by special pixels in the form of pn photo diodes, photo gates or pinned photo diodes, and wherein the distance measurement and the 3D reconstruction are done using the special pixels.

In this case, the pixels of the sensor that are not special pixels do not have an infrared cut-off filter, wherein individual areas of the image sensor are used for images in the infrared range and the remaining areas of the sensor are used for images in the visible light spectrum. As an alternative, the pixels of the sensor that are not special pixels have an infrared cut-off filter that can be dynamically activated in whole or in part or deactivated in relation to these pixels of the image sensor. The individual areas of the image sensor for which the infrared cut-off filter is deactivated are used for images in the infrared range, wherein the remaining areas of the sensor are used for images of high color quality in the visible light spectrum. The sensor is advantageously integrated in the 3D evaluation electronics.

The described multi-camera has five modes "images in the visible range", "images in the infrared range", "images in the visible and infrared range", "images in the visible range and 3D reconstruction" and "3D reconstruction". According to one embodiment of the invention, the pulsed infrared source can be integrated in the image sensor.

According to one variation of the invention, dielectric interference filters can be used as infrared cut-off filters, wherein in dependence upon the filter structure, in particular the coating thickness and the structuring of the filter, individual wavelengths are refracted differently, which causes the incident light to split and fall onto individual pixels in dependence on the wavelength. Thus, when using a dielectric interference filter as infrared cut-off filter, a different distribution of the refraction index and thus of the incident light across the sensor area can enabled in dependence on the wavelength, which blocks the infrared light for a portion of the area. In the context of one embodiment, the dielectric interference filters can be designed movable using electro-mechanical actuators, in order to thereby enable a dynamic activation or deactivation of the infrared cut-off filter for individual areas.

In addition to the stationary or movably designed interference filters, adjustable micro-mirror arrays can be used, which, if needed, each can reflect unwanted light, for example, infrared light, such that it does not fall on predetermined pixels. This forms a dynamically adjustable infrared cut-off filter in combination in particular with stationary designed dielectric interference filters.

According to another variation of the invention, piezo-electrically controllable interference filters can be used as the infrared cut-off filters and by using the piezo effect can dampen or amplify targeted wavelength ranges. Through these filters preferably larger areas or the entire sensor area can be dynamically illuminated using individual wavelengths, for example as a function of time in time multiplex operation.

Furthermore, electrically tunable liquid crystal filters can be used as infrared cut-off filters, which allow for a very targeted and flexible control of the wavelengths to pass through.

Switching between the five modes "images in the visible range", "images in the infrared range", "images in the visible and the infrared range", "images in the visible range and 3D reconstruction" and "3D reconstruction" can be done as described on demand with software or also automatically according to the respective ambient light. For example, it is possible to switch automatically from the mode "images in the visible light" to the mode "images in the infrared range" or "images in the visible and the infrared range" when the ambient brightness drops below a threshold value.

For the application of recognizing a license plate of a motor vehicle, an increase in the overall robustness can be achieved, when the detection is based on the evaluation of images in the visible and infrared ranges.

In the context of one embodiment of the invention, at least one additional camera that can be designed as a conventional digital camera and can be integrated in the barrier column or arranged at another suitable location can be provided in addition to the first camera. The images of the at least one additional camera can be evaluated independent of the images of the first camera, which for one increases the reliability and robustness and for another reduces the error rate at the vehicle recognition and license plate recognition. If the first camera is blinded through too high a light intensity, for example, a counter-check of color and shape of the vehicle can be enabled based on the other camera.

The evaluation of the images of the first camera and the additional camera can be done via a combined evaluation electronics or via separate evaluation electronics, wherein in the event of a combined evaluation electronics, the association of the resources with the first camera and the additional camera can be done based on configurable successive time windows.

Also, using the additional camera together with the first camera, a 3D image of the vehicle in the visible range of the light spectrum can be generated in terms of a close-range photogrammetry and can be compared with a database.

If, as described above, a 3D reconstruction of the detected object is carried out for the non-visible infrared frequency spectrum, color detection of the detected vehicle can be possible through the second camera. Furthermore, the second camera can be used as an approach sensor that activates the first camera when an object or a vehicle is in the entry or exit area.

The second camera can advantageously increase the robustness of an alarm analysis for a following vehicle if a distant angle of view to the passing vehicle is enabled. An attempt of a vehicle to follow can be verified by the first camera.

The concept according to the invention dispenses the need of providing induction loops for vehicle recognition and thus also the need of providing evaluation electronics for the induction loops. Furthermore, all functions relevant for the operation of a vehicle barrier that require a sensor are assumed by a camera with respective evaluation electronics, which significantly reduces production, maintenance and installation costs.

For a full understanding of the present invention, reference should now be made to the following detailed description of the preferred embodiments of the invention as illustrated in the accompanying drawings.

DESCRIPTION OF THE PREFERRED EMBODIMENTS

The preferred embodiments of the present invention will now be described with reference to FIGS. 1 and 2 of the drawings.

Figure 1:
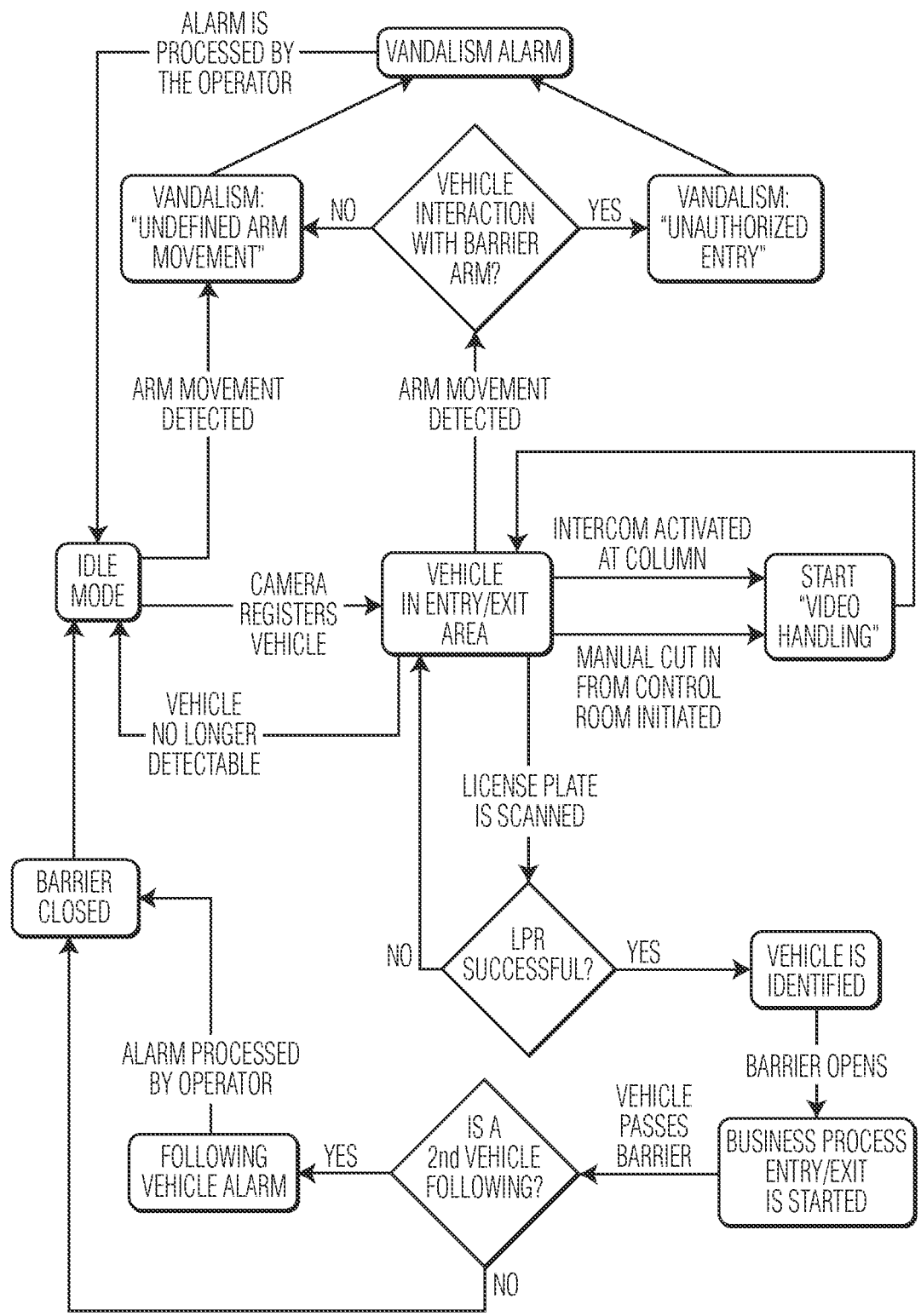
FIG. 1 a flow diagram to demonstrate the method according to the invention.

With reference to FIG. 1, the control of the vehicle barrier waits in the idle mode, in which the barrier arm is in the blocking position, for an input from an electronic evaluation logic that is connected to the camera which monitors the entry or exit area and the barrier arm. When a barrier arm movement is detected based on the evaluation of the images provided by the camera, and no movement of the barrier arm is intended in the vehicle barrier control, an undefined barrier arm movement is recognized and a vandalism alarm "undefined barrier arm movement" is issued, wherein the vehicle barrier subsequently transitions to the idle mode. In the event that the camera is designed as a multi-camera, monitoring can take place in the visible and/or the infrared range.

If a vehicle is in the entry or exit area during the idle mode of the vehicle barrier, this is recognized by the evaluation electronics based on the images provided by the camera, wherein after vehicle recognition license plate recognition (LPR) is performed based on the images provided by the camera. The vehicle is identified in the event of successful license plate recognition and the data is stored in a database or compared with the data of a database and the barrier arm of the vehicle barrier is actuated in terms of opening for entry or exit depending on the application such that the vehicle can pass. In the event that the camera is designed as a multi-camera, vehicle recognition can be carried out in the visible and/or in the infrared range, wherein a 3D reconstruction of the detected object can be performed using the multi-camera; additionally, license plate recognition can be carried out in the visible and/or the infrared range, wherein the license plate recognition in the visible and in the infrared range increases the robustness of the results.

In the event of exiting, the barrier arm can be actuated in terms of opening if the parking fee has been paid, which can be the case, for example, when the account of a long-term parker has been debited. In the context of one embodiment of the invention, a payment process is started in the event of exiting after successful license plate recognition in order to enable the driver to pay the parking fee via a respective device of the barrier column, for example via a device for transmitting credit card data. In the event of an entry, it can be provided that prior to actuating the barrier arm in terms of opening, a ticket is issued by a device that is integrated in the barrier column.

If the vehicle barrier is actuated in terms of opening for entry or exit depending on the application, a recognition of a following vehicle is activated based on the evaluation of images provided by the camera, wherein if no vehicle following the identified vehicle is recognized, the barrier arm is actuated in terms of closing and the vehicle barrier transitions to the idle mode. If an attempt to follow the vehicle is recognized, a following vehicle alarm is issued and if the following vehicle has passed as well, the barrier arm is actuated in terms of closing. Thereafter, the vehicle barrier transitions to the idle mode. Recognition of a following vehicle can be performed in the visible and/or infrared range, wherein license plate recognition in the visible and in the infrared range increases the robustness of the results.

If no vehicle is detected within a specified time after vehicle recognition and before the license plate recognition is carried out or the barrier arm is actuated in terms of opening, the vehicle barrier will also transition into the idle mode.

In the event that a vehicle is recognized in the entry or exit area and a movement of the barrier arm is detected using the evaluation of the images provided by the camera without a respective signal of the vehicle barrier control, a vandalism alarm is issued in the event that an interaction between vehicle and barrier arm is registered via the camera depending on the application for unauthorized entry or exist, wherein in the event that no interaction between vehicle and barrier arm is registered an undefined barrier arm movement is recognized and "undefined barrier arm movement" vandalism alarm is issued. Thereafter, the vehicle barrier transitions to the idle mode.

If after recognition of the vehicle in the entry or exit area no successful license plate recognition can be carried out, an intercom system at the barrier column is activated automatically or manually from a control room, wherein the images of the camera can be transferred to the control room as an option.

A transfer of the camera images to a control room can be activated at any time independent of the operating mode of the vehicle barrier.

Figure 2:
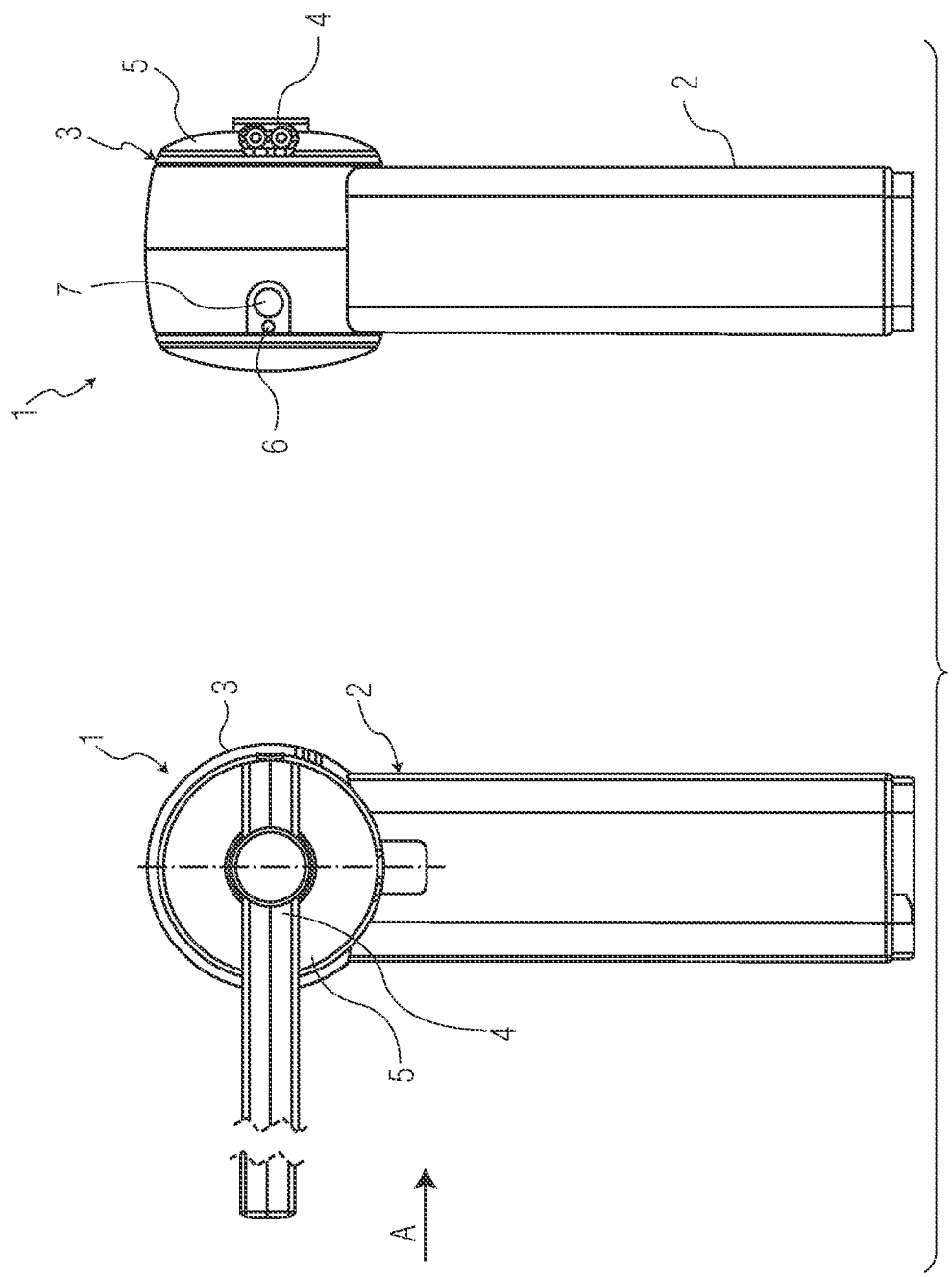
FIG. 2 one respective side view and one front view of a vehicle barrier with an integrated camera for carrying out the method according to the invention.

Presented in FIG. 2 in exemplary fashion is a vehicle barrier 1, comprising a barrier column 2 with a barrier head 3, a barrier arm 4 and a drive for pivoting the barrier arm 4 between the blocking and the open position arranged in the barrier column 2. The shown barrier arm 4 is connected rotationally fixed with a barrier head disc 5 that is functionally connected to the drive at the end that faces the barrier column 2 and is designed as a one-piece barrier arm, but can be designed as an articulated arm with a pivotable joint. In the event of right-hand traffic, the side shown in the left part of FIG. 2 corresponds to the rear side, i.e., the side of the vehicle barrier 1 that faces away from the approaching vehicles.

The right part of FIG. 2 shows a side view of the vehicle barrier 1 presented in the left part of FIG. 2 in the direction of the arrow A; at the shown example, the barrier column 2 of the vehicle barrier 1 has a brightness sensor 6 for adjusting the illumination of the barrier arm 4 in case the barrier arm 4 is designed as an illuminating barrier arm and/or for setting the luminous intensity of track lights in case the vehicle barrier 1 is provided with illuminated track lights that are adjustable in their brightness.

As can be seen in the right part of FIG. 2, the vehicle barrier 1 has a camera 7 integrated in the barrier column 2 for vehicle recognition, for license plate recognition, for recognition of a following vehicle and for monitoring for vandalism, the images of which are evaluated by evaluation electronics connected to the control of the vehicle barrier 1. As already explained, in terms of the invention the camera 7 can be designed as a conventional digital camera, as a camera for close-range photogrammetry or a multi-camera.

There has thus been shown and described a novel method for operating a vehicle barrier which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for operating a vehicle barrier having a barrier column, a barrier arm and a drive mechanism for pivoting the barrier arm between a blocking position and an open position, said method comprising the steps of obtaining digital images using a first camera and evaluating the images using an electronic evaluation logic, that is coupled to the camera and to a control for the vehicle barrier, for vehicle recognition, license plate recognition, recognition of a following vehicle and an occurrence of vandalism.

2. The method for operating a vehicle barrier as defined in claim 1, wherein the vehicle barrier has a idle mode in which the barrier arm is in the blocking position and the control for vehicle barrier waits for an input from the evaluation logic; wherein in the idle mode the camera monitors the entry or exit area and the barrier arm; wherein, if based on the evaluation of the images provided by the camera, a barrier arm movement is detected and no barrier arm movement is expected at this time in the control of the vehicle barrier, the barrier arm movement is recognized as an "undefined barrier movement" and a vandalism alarm is issued, whereby the vehicle barrier thereafter transitions into the idle mode;

wherein, when in the idle mode of the vehicle barrier a vehicle in the entry or exit area is recognized by images provided by the camera, a license plate recognition of the vehicle is carried out based on the images provided by the camera; wherein, in the event of a successful license plate recognition, the vehicle is identified and the data is stored in a database or compared with data in a database, the barrier arm of the vehicle barrier is moved to the open position for entry or exit, depending on the application, such that the vehicle can pass; wherein in the case of exiting the barrier arm is opened when the parking fee has been paid;

wherein, if the vehicle barrier is moved to the open position for entry or exit depending on the application, a recognition of a following vehicle is activated based on the evaluation of images provided by the camera; and wherein, if no vehicle following the identified vehicle is recognized, the barrier arm is moved to the blocking position and the vehicle barrier transitions to the idle mode.

3. The method for operating a vehicle barrier as defined in claim 2, wherein, in the event of exiting after successful license plate recognition, a payment process is initiated to enable the driver of the vehicle to pay the parking fee by means of a payment device in the barrier column.

4. The method for operating a vehicle barrier as defined in claim 2, wherein a ticket is issued prior to actuating the barrier arm to the open position.

5. The method for operating a vehicle barrier as defined in claim 2, wherein, if no vehicle is detected within a specified time after a vehicle recognition and before the license plate recognition is carried out, or the barrier arm is actuated to the open position, the vehicle barrier transitions into the idle mode.

6. The method for operating a vehicle barrier as defined in claim 2, wherein, in the event that a vehicle is recognized in the entry or exit area and a movement of the barrier arm is detected upon evaluation of the images provided by the camera without a respective signal of the vehicle barrier control, issuing a vandalism alarm for unauthorized entry or exit if an interaction between vehicle and barrier arm is registered using the camera, and wherein if no interaction between vehicle and barrier arm is registered, issuing an "undefined barrier arm movement" vandalism alarm.

7. The method for operating a vehicle barrier as defined in claim 2, wherein, if after recognition of a vehicle in the entry or exit area, a successful license plate recognition cannot be carried out, an intercom system at the barrier column can be activated from a control room and the images of the camera can be transferred to the control room.

8. The method for operating a vehicle barrier as in claim 1, wherein at least one additional second camera is provided at another suitable location, the images of which are evaluated independently of the images of the first camera, thereby to increase the reliability and reduce the error rates for vehicle recognition and license plate recognition.

9. The method for operating a vehicle barrier as defined in claim 1, wherein the first camera is one of a conventional digital camera, a camera for close-range photogrammetry and a camera that can be synchronized with an infrared source, the sensor thereof being responsive to visible light and infrared light.

10. The method for operating a vehicle barrier as defined in claim 9, wherein, using the camera that can be synchronized with an infrared source, selectively generating images in the visible or infrared range, images in the visible range and a 3D reconstruction of a detected object based on a runtime measurement in synchronization with the infrared source, or a 3D reconstruction of a detected object based on a runtime measurement in synchronization with the infrared source.

11. The method for operating a vehicle barrier as defined in claim 10, wherein, in the event of a camera that can be synchronized with an infrared source, the license plate recognition, recognition of a following vehicle and monitoring for vandalism are carried out based on the images generated in the visible range or based on the images generated in the infrared range, whereby, through the parallel evaluation of the images of both ranges, the robustness of the results is increased and wherein a 3D reconstruction is carried out for vehicle recognition.

12. The method for operating a vehicle barrier as defined in claim 11, wherein additionally a parallel evaluation of the images is carried out.

13. Method for operating a vehicle barrier as defined in claim 11, wherein, for license plate recognition, recognition of a following vehicle and monitoring for vandalism, switching is carried out automatically from the mode "images in the visible light" to the mode "images in the infrared range" or "images in the visible and the infrared range" when the ambient brightness drops below a prescribed threshold value.

* * * * *